United States Patent
Horikawa

(10) Patent No.: US 7,395,044 B2
(45) Date of Patent: Jul. 1, 2008

(54) SIGNAL PROCESSING APPARATUS AND METHOD OF DIFFERENTIAL TRANSFORMER

(75) Inventor: Toshiro Horikawa, Kawasaki (JP)

(73) Assignee: Mitutoyo Corporation, Kawasaki (JP)

( * ) Notice: Subject to any disclaimer, the term of this patent is extended or adjusted under 35 U.S.C. 154(b) by 623 days.

(21) Appl. No.: 11/133,352

(22) Filed: May 20, 2005

(65) Prior Publication Data

US 2005/0258817 A1    Nov. 24, 2005

(30) Foreign Application Priority Data

May 24, 2004   (JP)   ............... 2004-153115
May 13, 2005   (JP)   ............... 2005-141294

(51) Int. Cl.
H04B 1/06      (2006.01)
(52) U.S. Cl. .................. 455/260; 455/180.3; 455/326; 455/339; 324/118
(58) Field of Classification Search .............. 455/179.1, 455/180.1–180.3, 255–260, 323–326, 338–341; 324/118
See application file for complete search history.

(56) References Cited

U.S. PATENT DOCUMENTS

| | | | |
|---|---|---|---|
| 5,107,210 A | | 4/1992 | Shirao et al. |
| 5,117,181 A | | 5/1992 | Clergeot et al. |
| 6,208,875 B1 | * | 3/2001 | Damgaard et al. ........ 455/552.1 |
| 6,753,686 B2 | | 6/2004 | Tsuboi |
| 6,856,794 B1 | * | 2/2005 | Tso et al. ................. 455/260 |
| 6,882,680 B1 | * | 4/2005 | Oleynik ................... 375/147 |
| 7,046,960 B2 | * | 5/2006 | Takemoto et al. ........... 455/24 |
| 7,184,716 B2 | * | 2/2007 | Mohan .................... 455/78 |

FOREIGN PATENT DOCUMENTS

| | | |
|---|---|---|
| EP | 0 435 233 A1 | 7/1991 |
| EP | 0 441 074 A2 | 8/1991 |
| JP | A 56-143923 | 11/1981 |
| JP | A 58-009019 | 1/1983 |
| JP | A 2002-340505 | 11/2002 |

* cited by examiner

*Primary Examiner*—Edward Urban
*Assistant Examiner*—Nhan T. Le
(74) *Attorney, Agent, or Firm*—Oliff & Berridge, PLC

(57) ABSTRACT

A measuring apparatus employing a differential transformer includes a high-frequency oscillator which generates a high-frequency signal having a frequency higher than the excitation frequency of the differential transformer, a frequency divider which divides the high-frequency signal to generate a driving signal for the differential transformer, a multiplier or divider which reduces the frequency of the high frequency signal by the frequency of the driving signal, a mixer which mixes the output from the multiplier or the divider with the output from the differential transformer, a high-pass filter or a band-pass filter which cuts a low-frequency component of the output from the mixer, and a double balanced mixer which synchronously detects the output from the high-pass filter or the band-pass filter with the use of the high-frequency signal. With the use of the thus configured apparatus, an output signal having a fast response speed can be obtained through the use of an existing head having a low excitation frequency.

7 Claims, 5 Drawing Sheets

SIGNAL PROCESSING APPARATUS AND METHOD OF DIFFERENTIAL TRANSFORMER

CROSS-REFERENCES TO RELATED APPLICATION

The disclosure of Japanese Patent Application No. 2004-153115 filed May 24, 2004 and Japanese Patent Application No. 2005-141294 filed May 13, 2005 including specifications, drawings and claims is incorporated herein by reference in their entireties.

BACKGROUND OF THE INVENTION

1. Field of the Invention

The present invention relates to a signal processing apparatus and method of a differential transformer for obtaining a measurement signal having a fast response speed from a differential transformer having a low excitation frequency. More particularly, the present invention relates to a signal processing apparatus and method of a differential transformer suitably employed in a high-resolution electric micrometer having a resolution of approximately 1 nm, in which the response speed of a measurement signal can be increased by a factor of 10 to 100 (200 Hz to 2 kHz) with the use of a conventional head having an excitation frequency of approximately 5 kHz.

2. Description of the Related Art

A conventional electric micrometer has been configured as disclosed in Japanese Patent Laid-Open Publication No. 2002-340505. In the electric micrometer includes, as shown in FIG. 1, the displacement of a spindle 22 which is a part of a head 20 is transferred to a core 26, and sensor coils 28 and 30 are placed symmetrically with respect to the mechanical center point (neutral point) of the core 26 and are connected each other in series to form a differential transformer. When a voltage is applied to the sensor coils 28 and 30 through an external oscillator 32, voltages E1 and E2 are generated at the ends of the sensor coils 28 and 30, respectively, as shown in FIG. 2 due to the impedance change of the sensor coils 28 and 30 according to the position of the core 26. The displacement of the spindle 22 is detected through the voltage difference (E1−E2) based on the change in the position of the core 26.

Specifically, as shown in FIG. 3, a sine-wave driving signal having a frequency of, for example, 5 kHz generated in the oscillator 32 is applied to the sensor coils 28 and 30 (not shown in FIG. 3) of the head (cartridge head or lever head) 20 via a driving amplifier 34. The output signal obtained from the neutral point of the sensor coils 28 and 30 is amplified by a preamplifier 36, and the amplified signal is half-wave or full-wave rectified by means of a synchronous detector 38 in synchronization with the excitation signal generated by the oscillator 32. The 5 kHz component of the rectified signal is removed by a low-pass filter (LPF) 40, and the filtered analog signal is then displayed on a meter. Alternatively, the filtered analog signal is converted into a digital signal by means of an analog-digital (A/D) converter 42, and the converted digital signal is digitally processed by a microprocessor 44 to digitally display. The digital data output signal output from the microprocessor 44 is subjected to processing by means of, for example, a parallel-serial converter, a shift register, a gate, a communication driver, and the like in accordance with need.

However, since the electronic micrometer is composed of the differential transformer (inductor), the balance adjustment for the capacitance component and also for the inductance component cannot be made with the use of a resistor. Therefore, the signal at the reference position cannot be accurately adjusted to zero. In addition, the excitation frequency cannot be increased due to the characteristics of the head 20, for example, it is at most 5 kHz. Therefore, a ripple component having a frequency of 5 kHz and generated at the synchronous detector 38 remains in the subsequent stages of the circuit. Therefore, the LPF 40 having a low cut-off frequency must be provided after the synchronous detector 38. However, this causes a reduction in the response speed (for example, approximately 20 Hz (−3dB) in a low-end product having a resolution of 0.1 μm). Further, in a high-precision electronic micrometer which requires a resolution of approximately 1 nm, the response speed becomes much slower (several hundred milliseconds (several Hz)).

Although the above problems may be solved through increasing the excitation frequency of a head, modifications to the head means that a newly designed head must be developed.

BRIEF SUMMARY OF THE INVENTION

In view of the foregoing problems, various exemplary embodiments of this invention provide a measurement signal with a fast response speed from a differential transformer having a low excitation frequency.

According to one aspect of the present invention, there is provided a signal processing apparatus of a differential transformer for obtaining a measurement signal with a fast response speed from a differential transformer having a low excitation frequency. The signal processing apparatus comprises: a high-frequency oscillator which generates a high-frequency signal having a frequency higher than the excitation frequency of the differential transformer; a frequency divider which divides the high-frequency signal to generate a driving signal for the differential transformer; frequency reduction means which reduces the frequency of the high-frequency signal by the frequency of the driving signal; a mixer which mixes an output from the frequency reduction means with an output from the differential transformer; a high-pass filter or a band-pass filter which cuts a low-frequency component of an output from the mixer; and means which synchronously detects the output from the high-pass filter or the band-pass filter with the use of the high-frequency signal. The thus configured apparatus has solved the above-mentioned problems.

The signal processing apparatus further comprises: a first PLL circuit which extracts and holds a frequency component of an output from the high-pass filter or the band-pass filter; and a first phase shifter which matches the phase of the high-frequency signal to a phase of an output from the high-pass filter or the band-pass filter. This ensures that the phase of the high-frequency signal is matched to the phase of the output from the high-pass filter.

In addition, the signal processing apparatus further comprises: a second PLL circuit which extracts and holds a frequency component of the output from the frequency reduction means; and a second phase shifter which matches a chase of the output from the frequency reduction means to a phase of the output from the differential transformer. This ensures that the phase of the output from the frequency reduction means is matched to the phase of the output from the differential transformer.

According to another aspect of the present invention, there is provided a signal processing method of a differential transformer for obtaining a measurement signal with a fast response speed from a differential transformer having a low excitation frequency, the method comprising the steps of:

generating a high-frequency signal having a frequency higher than the excitation frequency of the differential transformer; dividing the high-frequency signal to generate a driving signal for the differential transformer; reducing the frequency of the high-frequency signal by the frequency of the driving signal; mixing the frequency reduced signal with an output from the differential transformer; cutting a low-frequency component of the mixed signal; and detecting the low-frequency cut signal with the use of the high-frequency signal.

According to the present invention, a measurement signal with a fast response speed can be obtained from a differential transformer having a low excitation frequency. Therefore, the response speed can be increased by a factor of 10 to 100 through the use of an electric circuit without modifying the existing head.

These and other novel features and advantages of the present invention will become apparent from the following detailed description of preferred embodiments.

BRIEF DESCRIPTION OF THE DRAWINGS

The preferred embodiments will be described with reference to the drawings, wherein like elements have been denoted throughout the figures with like reference numerals, and wherein.

DESCRIPTION OF THE PREFERRED EMBODIMENT

An embodiment of the present invention will next be described in detail with reference to the drawings.

Figure 1:
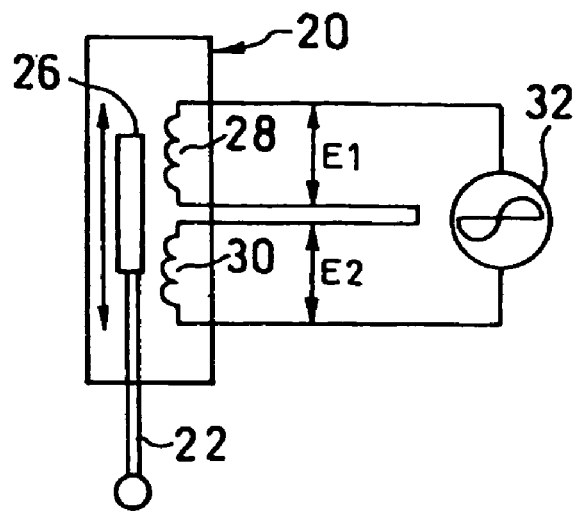
FIG. 1 is a diagram showing the configuration of a differential transformer employed in an electric micrometer, for explaining the principle of the differential transformer.
Figure 2:
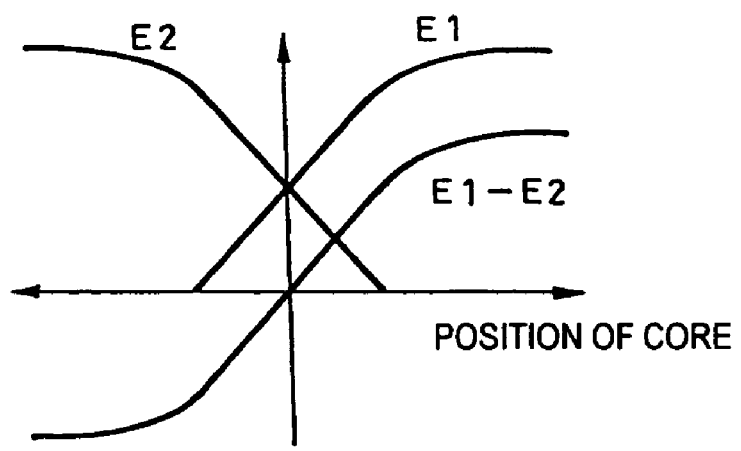
FIG. 2 is a graph showing an example of the output from the sensor coils of the differential transformer.
Figure 3:
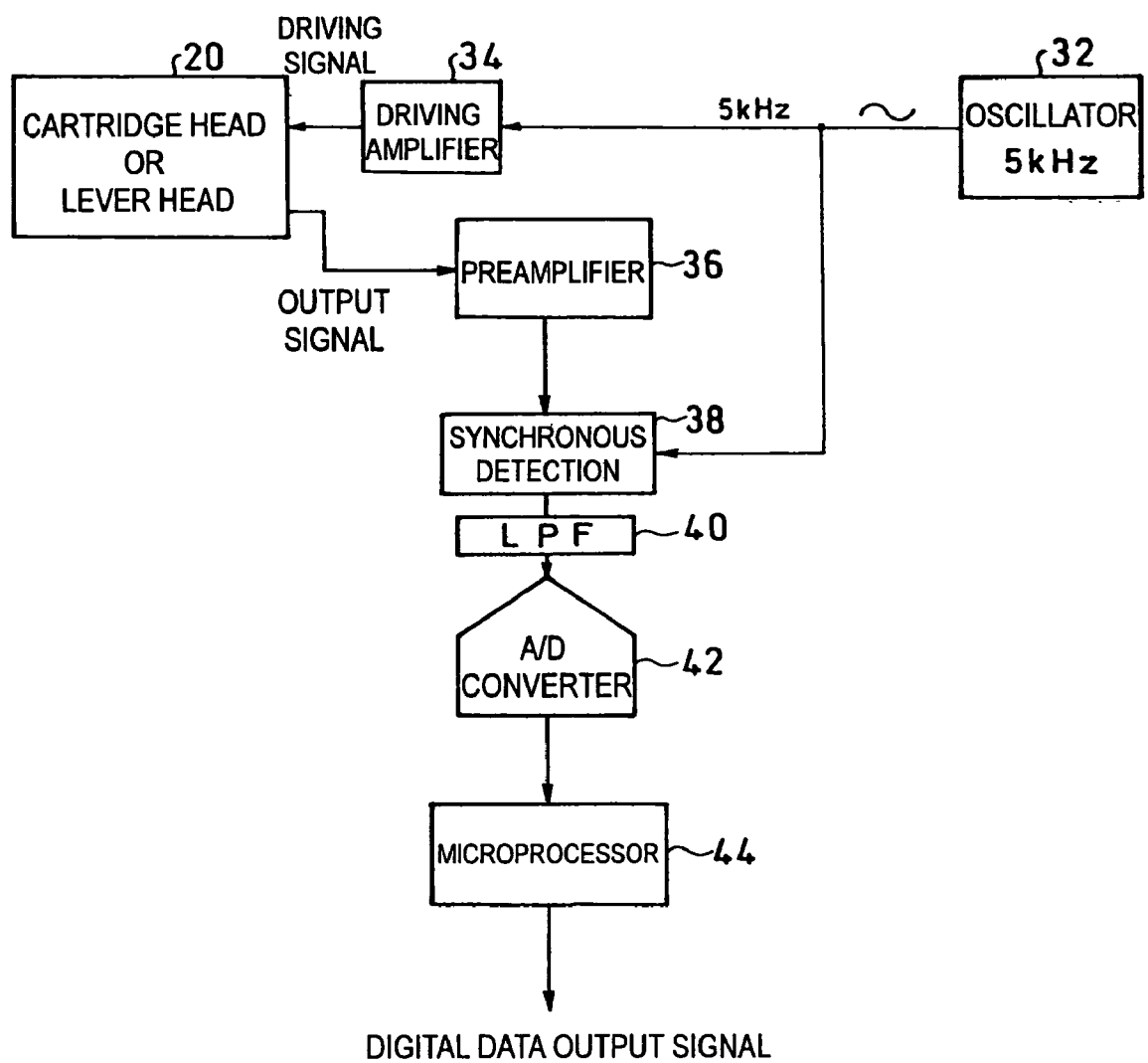
FIG. 3 is a block diagram showing an example of the configuration of a signal processing apparatus employed in a conventional electric micrometer.
Figure 4:
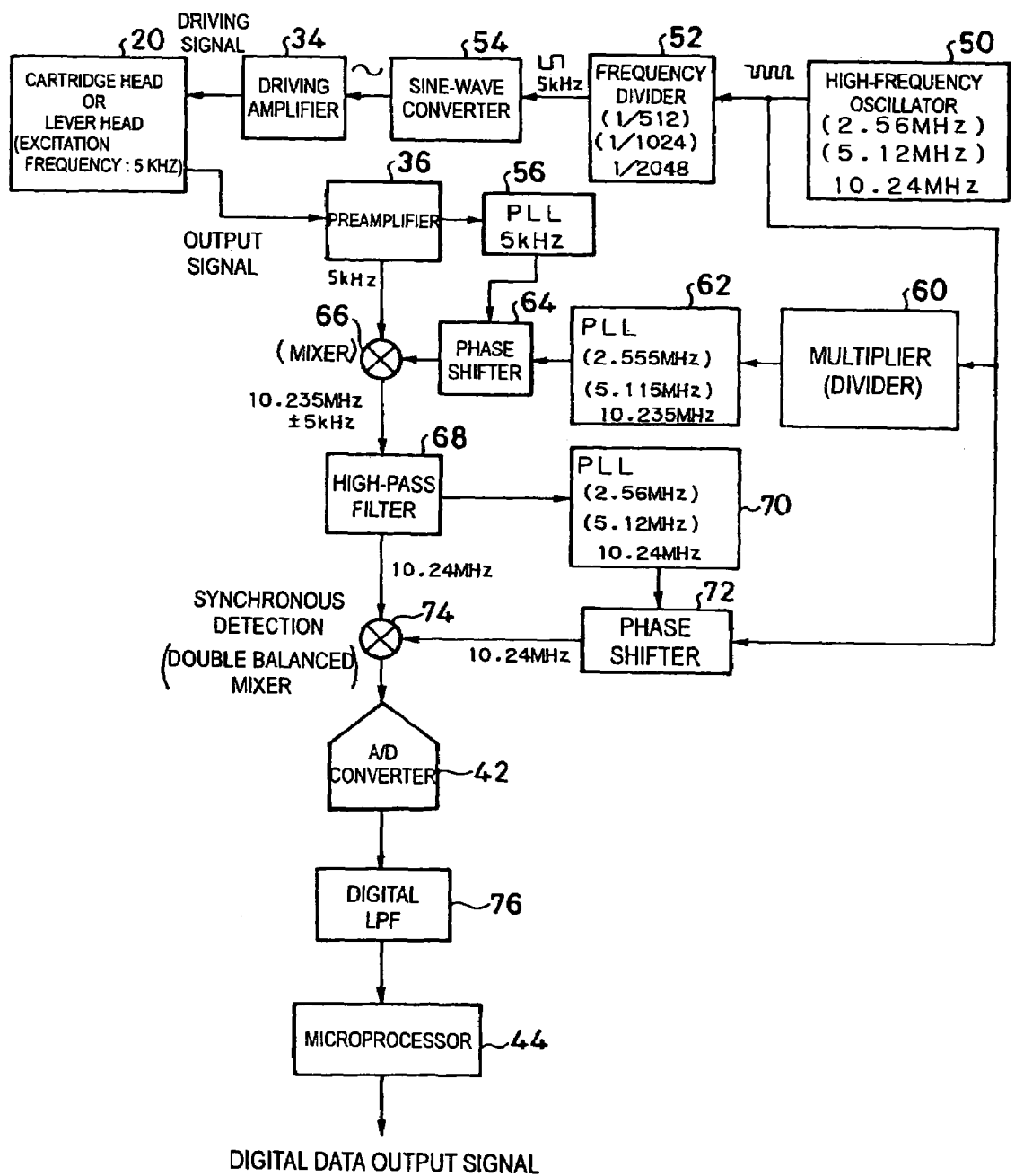
FIG. 4 is a block diagram showing the configuration of a first exemplary embodiment of the present invention.

As shown in FIG. 4, the electric micrometer of a first exemplary embodiment of the present invention comprises, as in the conventional electric micrometer, a cartridge head or lever head (hereinafter referred to simply as a head) 20 with an excitation frequency of 5 kHz, a driving amplifier 34, a preamplifier 36, an A/D converter 42, and a microprocessor 44. The electric micrometer further comprises: a high-frequency (carrier wave) oscillator 50; a frequency divider 52; a sine-wave converter 54; a phase-locked loop (PLL) circuit 56; a multiplier (or divider) 60; a first PLL circuit 70; a first phase shifter 72; a mixer 66; a high-pass filter (HPF) 68; a second PLL circuit 62; a second phase shifter 64; a double balanced mixer 74; and an LPF 76.

The high-frequency (carrier wave) oscillator 50 generates a rectangular shaped high frequency (carrier wave) signal having a radio frequency (for example, 2.56 MHz, 5.12 MHz, or 10.24 MHz) higher than the excitation frequency of the head 20 (5 kHz) by a factor of 500 to several thousand.

The frequency divider 52 divides the high-frequency signal output from the high-frequency oscillator 50 (for example, by a factor of 1/512, 1/1024, or 1/2048) to obtain a signal having a frequency of 5 kHz (the excitation frequency of the head 20).

The sine-wave converter 54 converts the rectangular wave signal output from the frequency divider 52 to a sine-wave signal to obtain a driving signal to be input to the driving amplifier 34 as in the conventional electric micrometer.

The PLL circuit 56 extracts and holds a component with the same frequency as the excitation frequency (5 kHz) from the output of the preamplifier 36 as in the conventional electric micrometer.

The multiplier (or divider) 60 serves as frequency reduction means which reduces the high frequency signal output from the high-frequency oscillator 50 by the excitation frequency.

The second PLL circuit 62 accurately generates a signal having a frequency of 2.555 MHz, 5.115 MHz, or 10.235 MHz from the output of the multiplier 60.

The second phase shifter 64 matches the phase of the output from the multiplier 60 via the second PLL circuit 62 to the phase of the output from the preamplifier 36.

The mixer 66 mixes and modulates the output from the preamplifier 36 and the output from the second phase shifter 64.

The HPF 68 cuts a component having a lower frequency (for example, 10.23 MHz) from the output of the mixer 66 (if the frequency of the high-frequency signal is 10.24 MHz, the frequencies of the output are 10.235 plus or minus 5 kHz) and passes a component having a higher frequency (for example, 10.24 MHz).

The first PLL circuit 70 extracts and holds a component having a frequency of 2.56 MHz, 5.12 MHz, or 10.24 MHz output from the HPF 68.

The first phase shifter 72 shifts the phase of the output from the high-frequency oscillator 50 according to the output from the first PLL circuit 70.

The double balanced mixer 74 detects the output from the HPF 68 in synchronization with the output from the first phase shifter 72.

The LPF 76 such as a digital LPF which is smaller than a conventional LPF passes a low-frequency component of the signal output from the double balanced mixer 74. The LPF 76 is provided at the output side of the A/D converter 42. Alternatively, the digital LPF 76 may be replaced with an analog filter provided before the A/D converter 42.

Figure 5:
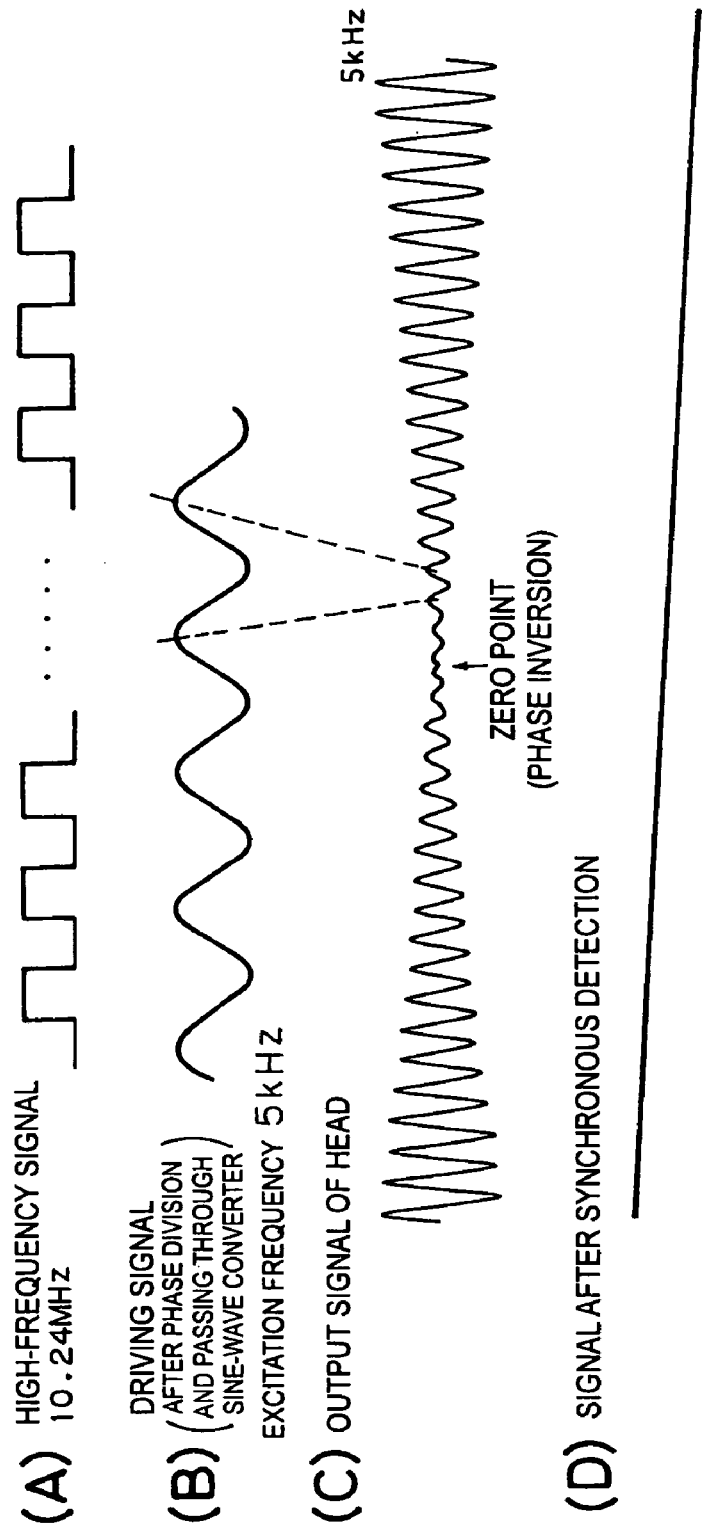
FIG. 5 is a diagram showing the signal waveforms output from various parts of the first exemplary embodiment.

The signal waveforms output from various parts of the present exemplary embodiment are shown in FIG. 5.

As described above, the response speed can be increased through mixing a high-frequency signal to the output from the conventional head 20.

In this exemplary embodiment, the signal can be easily divided by the frequency divider 52 since the high-frequency oscillator 50 can generate a rectangular-shaped wave. No particular limitation is imposed on the method of dividing the output from the high-frequency oscillator 50. The sine-wave converter 54 may be omitted if a high-frequency oscillator generating a sine wave is employed.

In the present exemplary embodiment, the phases of the signals can be accurately matched with each other since the second phase shifter 64 together with the second PLL circuit 62 and the first phase shifter 72 together with the first PLL circuit 70 are provided. One or both of the phase shifters may be omitted depending on performance specifications.

Figure 6:
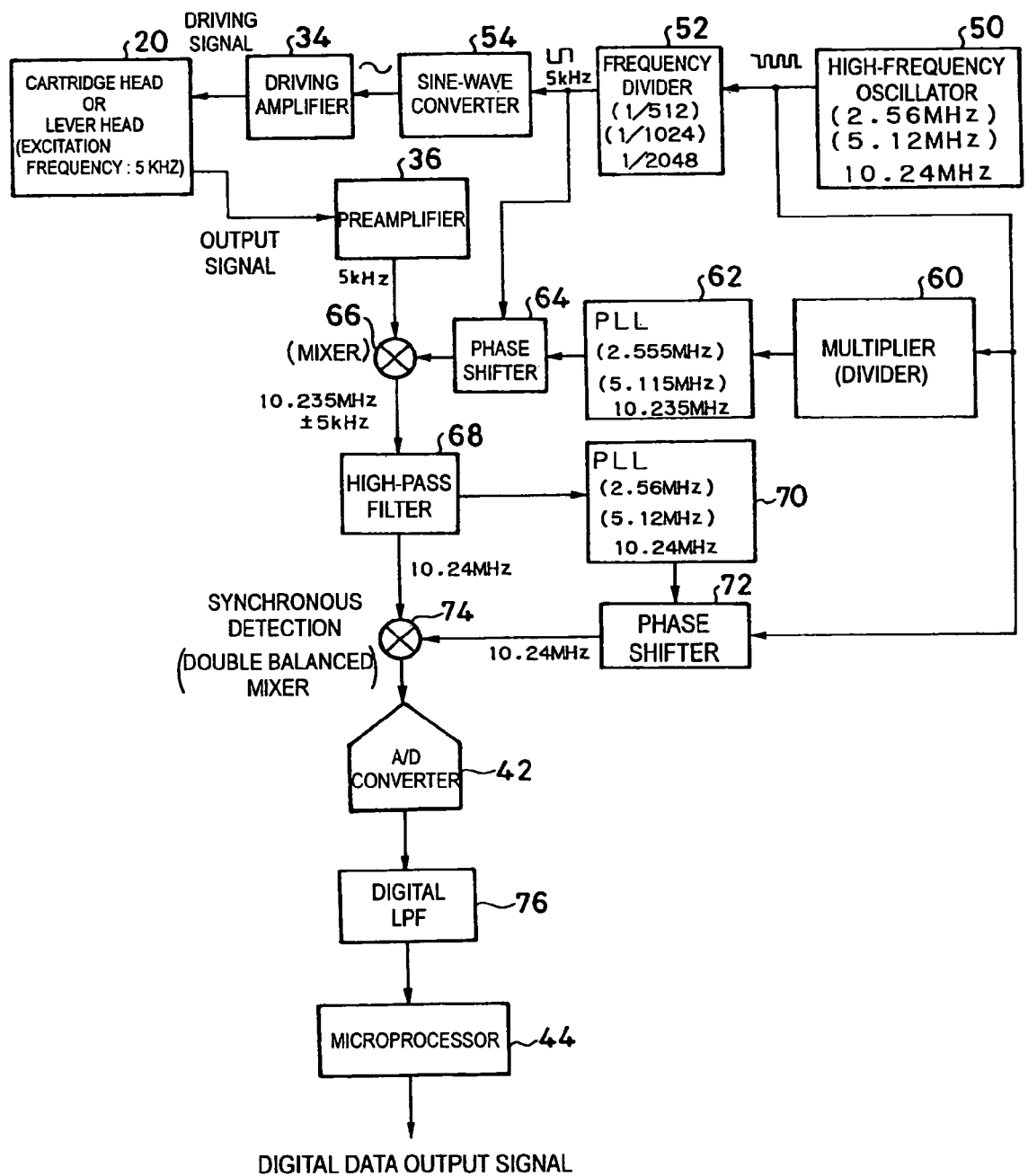
FIG. 6 is a block diagram showing the configuration of a second exemplary embodiment of the present invention.

Further, as shown in FIG. 6, according to a second exemplary embodiment the PLL circuit 56 of the first exemplary embodiment is omitted to deliver a signal with a frequency of 5 kHz from the frequency divider 52 to the second phase shifter 64.

The high-pass filter 68 may be replaced with a band-pass filter or may be combined with a notch filter or a band-pass filter matched to the target frequency. It is preferred to adopt a band-pass filter having steep notch characteristics to increase the S/N ratio.

In the exemplary embodiment described above, the present invention has been applied to an electric micrometer, but the present invention may also be applied to other electric microproducts and other general measuring apparatus employing a differential transformer.

It should be apparent to those skilled in the art that the above-described embodiments are merely illustrative which represent the application of the principles of the present invention. Numerous and varied other arrangements can be readily devised by those skilled in the art without departing from the spirit and the scope of the invention.

What is claimed is:

1. A signal processing apparatus of a differential transformer for obtaining a measurement signal with a fast response speed from a differential transformer having a low excitation frequency, the apparatus comprising:
   a high-frequency oscillator which generates a high-frequency signal having a frequency higher than the excitation frequency of the differential transformer;
   a frequency divider which divides the high-frequency signal to generate a driving signal for the differential transformer;
   frequency reduction means which reduces the frequency of the high-frequency signal by the frequency of the driving signal;
   a mixer which mixes an output from the frequency reduction means with an output from the differential transformer;
   a high-pass filter or a band-pass filter which cuts a low-frequency component of an output from the mixer;
   means which synchronously detects the output from the high-pass filter or the band-pass filter with the use of the high-frequency signal;
   a first PLL circuit which extracts and holds a frequency component of an output from the high-pass filter or the band-pass filter; and
   a first phase shifter which matches the phase of the high-frequency signal to a phase of an output from the high-pass filter or the band-pass filter.

2. The signal processing apparatus of a differential transformer according to claim 1, further comprising:
   a second PLL circuit which extracts and holds a frequency component of the output from the frequency reduction means; and
   a second phase shifter which matches a phase of the output from the frequency reduction means to a phase of the output from the differential transformer.

3. The signal processing apparatus of a differential transformer according to claim 1, wherein
   the high-frequency oscillator outputs a rectangular shaped wave.

4. The signal processing apparatus of a differential transformer according to claim 1, wherein
   the high-frequency oscillator outputs a sine wave.

5. The signal processing apparatus of a differential transformer according to claim 1, wherein
   the frequency reduction means is a multiplier or a divider.

6. The signal processing apparatus of a differential transformer according to claim 1, wherein
   the means which synchronously detects the output is a double balanced mixer.

7. A signal processing method of a differential transformer for obtaining a measurement signal with a fast response speed from a differential transformer having a low excitation frequency, the method comprising the steps of:
   generating a high-frequency signal having a frequency higher than the excitation frequency of the differential transformer;
   dividing the high-frequency signal to generate a driving signal for the differential transformer;
   reducing the frequency of the high-frequency signal by the frequency of the driving signal;
   mixing the frequency reduced signal with an output from the differential transformer;
   cuffing a low-frequency component of the mixed signal;
   detecting the low-frequency cut signal with the use of the high-frequency signal;
   a first PLL circuit which extracts and holds a frequency component of an output from the high-pass filter or the band-pass filter; and
   a first phase shifter which matches the phase of the high-frequency signal to a phase of an output from the high-pass filter or the band-pass filter.

* * * * *